United States Patent [19]

Takahashi

[11] Patent Number: 4,832,768
[45] Date of Patent: May 23, 1989

[54] METHOD OF FORMING PLASTIC FASTENER AND PLASTIC ACCESSORY STRIPS AND UNITING THE SAME WITH A FILM

[75] Inventor: Katsuhito Takahashi, Hamakita, Japan

[73] Assignee: Minigrip, Inc., Orangeburg, N.Y.

[21] Appl. No.: 84,519

[22] Filed: Aug. 11, 1987

Related U.S. Application Data

[62] Division of Ser. No. 632,661, Jul. 20, 1984, Pat. No. 4,698,118.

[51] Int. Cl.[4] .................. B29C 47/04; B29C 65/70
[52] U.S. Cl. ........................... 156/66; 24/576; 156/244.25; 156/309.9; 156/500; 264/177.1; 383/63
[58] Field of Search ............ 156/66, 176, 243, 244.11, 156/244.25, 244.27, 499, 500, 538, 543, 554, 555, 582, 501, 309.9; 264/40.6, 176.1, 177.17, 177.19, 250, 251, 252, 254, 255, 259; 425/113, 120, 122, 814, 382 R; 383/63; 24/576, 587; 428/35, 172

[56] References Cited

U.S. PATENT DOCUMENTS

| 3,787,269 | 1/1974 | Noguchi | 156/500 X |
| 3,945,872 | 3/1976 | Noguchi | 156/500 X |
| 4,306,924 | 12/1981 | Kamp | 156/244.23 X |
| 4,419,159 | 12/1983 | Herrington | 156/500 X |
| 4,428,788 | 1/1984 | Kamp | 264/259 X |

FOREIGN PATENT DOCUMENTS 965567 4/1975 Canada.

Primary Examiner—Robert A. Dawson
Attorney, Agent, or Firm—Hill, Van Santen, Steadman & Simpson

[57] ABSTRACT

For producing a plastic film having a plastic fastener, with male and female interlockable profiles, and accessory strips, such as ribs and strips, in preparation of a reclosable plastic bag, there is provided a first forming die which extrudes the accessory strips, a separate second forming die which extrudes the fastener, a pair of nip rolls for press-bonding the accessory strips onto the surface of the film being fed in the vicinity of the first forming die, and a bonding roll for receiving the film with press-bonded accessory strips and the fastener from the second forming die placed onto the film surface such that the fastener is bonded to the surface of the film at the bonding roll by virtue of heat.

7 Claims, 3 Drawing Sheets

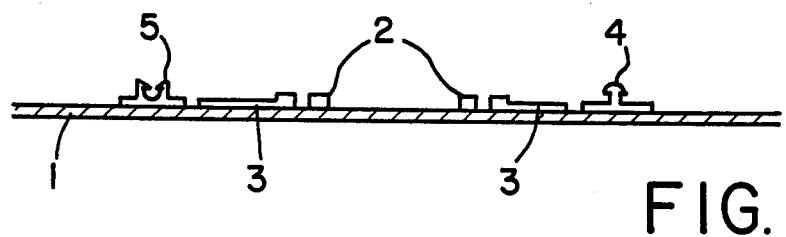
FIG. 1
FIG. 2
(PRIOR ART)
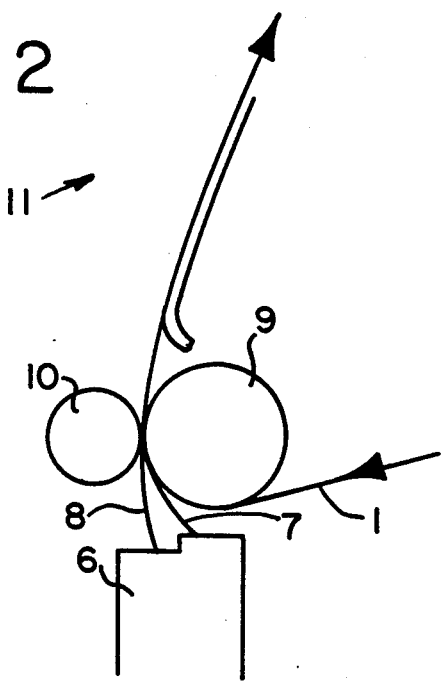

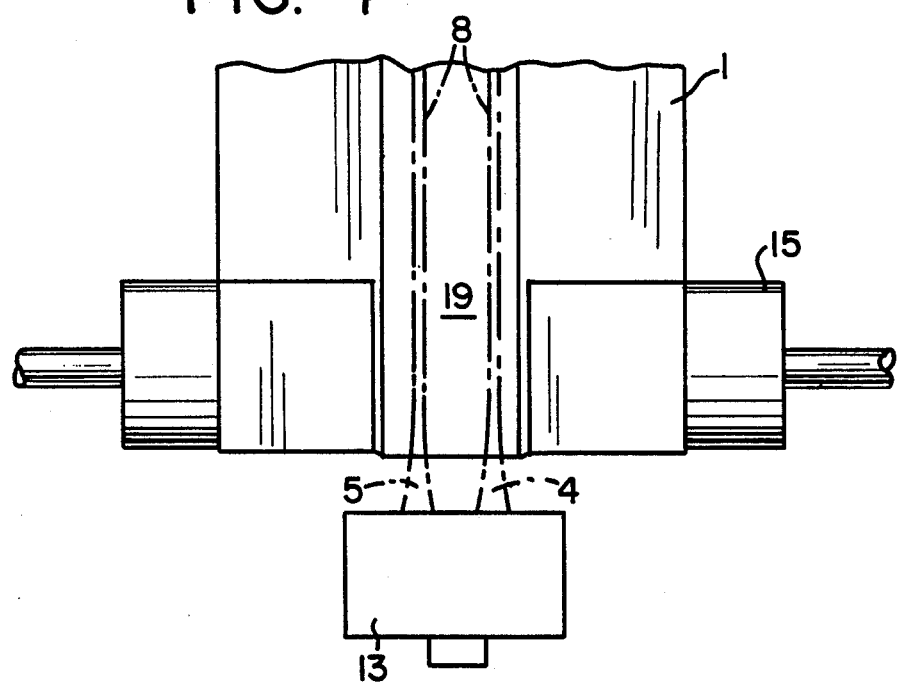

METHOD OF FORMING PLASTIC FASTENER AND PLASTIC ACCESSORY STRIPS AND UNITING THE SAME WITH A FILM

This is a division, of application Ser. No. 632,661, filed July 20, 1984 now U.S. Pat. No. 4,698,118.

BACKGROUND OF THE INVENTION

The present invention relates to a method of forming a plastic fastener and plastic accessory strips and uniting the same with a film having a single layer or a plurality of layers, which film is then converted into reclosable bags.

Such bags or pouches are known as having a body made of a single or a plurality of layers and an opening which can be opened or closed by means of a plastic fastener. In such bags or pouches, the opening/closing function can be assisted by providing ribs in the vicinity of the plastic fastener so as to prevent the adherence of the film to itself at the upper edges of the opening and to facilitate the grasping of the opening lip and by bonding fillets for reinforcing the bag or pouch to the portion between the ribs and the plastic fastener.

SUMMARY OF THE INVENTION

The present invention is a method of producing a plastic film having a plastic fastener and accessory strips, such as ribs and fillets, for making a reclosable bag. The method includes use of a first forming die which extrudes the accessory strips, a second forming die which extrudes the fastener having male and female profiles, a pair of nip rolls for press-bonding the accessory strips onto the surface of film being fed thereto, a bonding guide roll for receiving the film with press-bonded accessory strips and the fastener from the second forming die placed onto the film in parallel to the accessory strips such that the fastener is bonded to the film at the bonding guide roll by virtue of the heat imparted to the fastener during formation of the fastener.

BRIEF DESCRIPTION OF THE DRAWING

FIG. 1 is a cross-sectional view of a film to which a plastic fastener and accessory strips have been bonded.

FIG. 2 is a side elevational view showing a conventional method for bonding a fastener and accessory strips to a plastic film.

FIG. 4 is a partial front view of FIG. 3 in the direction of arrow IV of FIG. 3.

DETAILED DESCRIPTION OF THE PREFERRED EMBODIMENT

Figure 3:
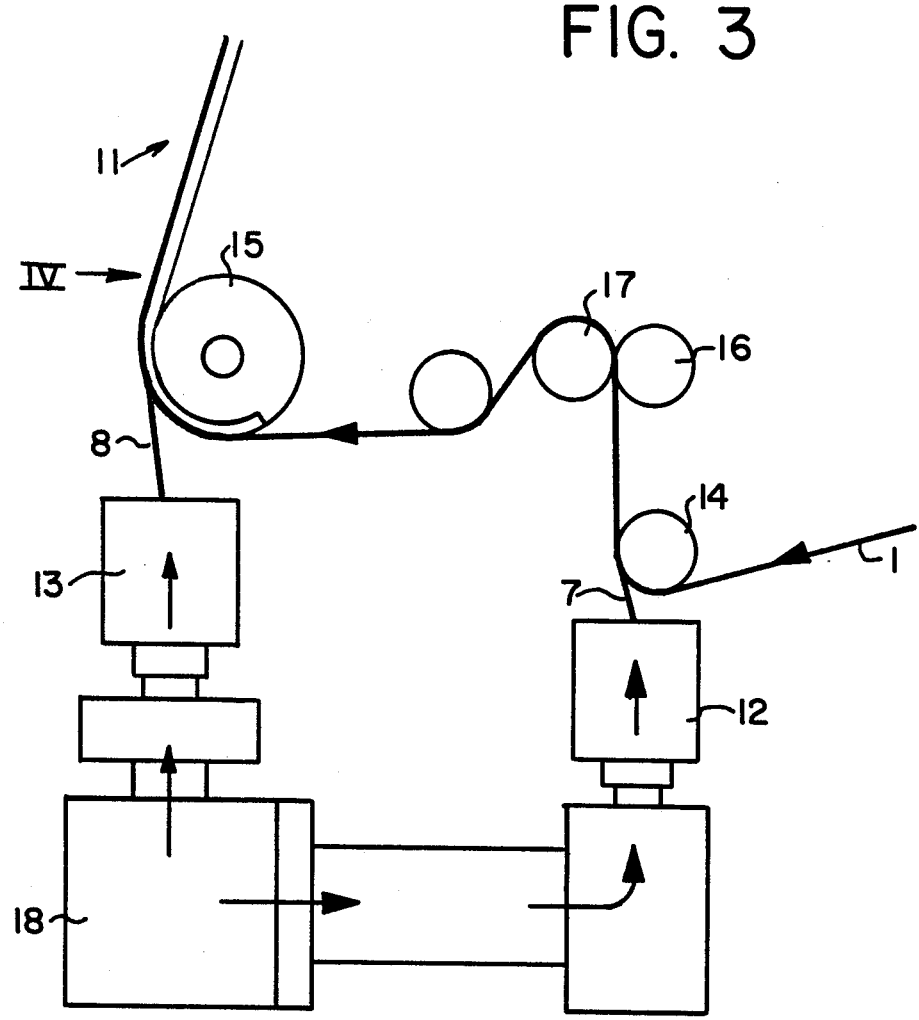
FIG. 3 is a side elevational view showing a method of the invention for bonding a fastener and accessory strips to plastic film.

As shown in FIG. 1, reclosable bag film can be produced by extruding accessory strips, such as ribs 2 and fillets 3, and the like, as well as a fastener having the male profile 4 and female profile 5, onto a flat film 1 and bonding them to the latter by the heat which has been imparted to them during forming by extrusion.

A conventional forming and uniting method, as shown in FIG. 2, employs a single die 6 which simultaneously extrudes and forms accessory strips 7, such as the ribs 2 and the fillets 3, and a plastic fastener 8, including male and female profiles 4, 5. The extruded accessory strips 7 and the fastener 8 are bonded by the possessed heat to the film 1 which runs along a bonding roll 9 disposed in the vicinity of the die 6. The accessory strips 7 are then pressed by means of a press roll 10 onto the film 1 which is then forwarded to a cooling area 11.

This conventional method, however, has encountered various problems because of the fact that while the accessory strips 7 and the fastener 8 had different forms and material composition weight ratios they were nevertheless extruded and formed by a single die 6 under the same temperature condition.

In fact, the fastener and the accessory strips, which have different shapes and weights should be formed at different optimum temperatures. As long as the extrusion is made with a single die, however, it is not possible to use different temperatures, so that actually the extrusion is made at a temperature which is optimum only for either the fastener or the accessory strips. Assuming for example that the die temperature is set at an optimum level for the extrusion of the fastener, the accessory strips may fail to be united with the film 1, since the bonding thereof is made under the same conditions as those of the fastener 8. This is because the accessory strips 7 exhibit greater heat loss from radiation than the fastener 8 due to their specific weight being smaller than that of the fastener 8 and due to their thin-walled flat from presenting a greater heat radiation surface area. To the contrary, if the extrusion is made at a die temperature suitable for the bonding of the accessory strips, such a die temperature is too high for the extrusion of the fastener so that the fastener is in an undesirably molten state.

Another problem involved by the conventional method is the result of the fact that the fastener and the accessory strips are bonded to the film on the same roll 9. Thus, when the accessory strips 7 are pressed by the press roll 10, the portion of the roll adjacent to the fastener 8 is also pressed on causing an elastic deformation of the rubber with which the roll 9 is covered thereby forming indentations in that portion of the rubber. Such indentation causes various problems such as bonding of the fastener at a slant, deformation of the fastener itself, and so forth.

Thus, as bonding roll 9 is continuously pressed by the press roll 10, the pressed portion of the roll is locally degraded and plastically deformed and loses the elasticity of the rubber thereby allowing the formation of indentations in the bonding surface of the roll. This in turn results in the bonding of the fastener 8 at a slant or in deformation of the fastener 8 itself.

To eliminate this problem, the present invention proposes a method in which a die for extruding the accessory strips and a die for extruding the fastener are arranged on one or more separate extruders in a side-by-side fashion, so as to allow the forming temperature of the die for extruding the accessory strips to be higher than the forming temperature of the die for extruding the fastener. In this fashion the fastener and the accessory strips are extruded separately and then welded and bonded to the film running around respective sets of bonding rolls such that the heat retained by said accessory strip from its extrusion does not interfere with the bonding of the fastener at a different bonding temperature.

A preferred embodiment of the invention is described hereinunder with reference to FIGS. 3 and 4. Referring to these Figures, a first forming die 12 for extruding the accessory strips 7 and a second forming die 13 for extruding the fastener 8 having the male and female profiles 4, 5 are disposed independently of one another and in a side-by-side fashion to each other and connected to an alongside plastic extruder 18. The film 1 is unrolled from a reel. Heating means (not shown) may be associated with the forming dies for respectively heating the film prior to disposition at the bonding rolls. The accessory strips 7 extruded from the first die 12 are adapted to be joined to the film 1 on a roll 14 which is disposed in the vicinity of the first forming die 12. A press roll 16 and opposing embossing roll 17 forming a roll nip for pressing the accessory strips 7 onto the film 1 are disposed in the vicinity of the roll 14.

A roll 15 disposed in the vicinity of the second die 13 is adapted to bond the fastener 8 to the film having the accessory strips and to guide this film with the fastener 8 to the next step of process. As shown in FIG. 4, the roll 15 has a groove 19 adapted to guide both sides of the fastener 8 as it is bonded to the film 1. A reference numeral 11 designates a downstream cooling step.

In operation, the accessory strips 7 such as ribs 2 and fillets 3 extruded from the first die 12 are welded by the heat retained from their extrusion to the film 1 running on the roll 14. Then, the film together with the accessory strips 7 is moved through the nip between the press roller 16 and the embossing roller 17, so that the accessory strips 7 are pressed and bonded onto the film 1.

Subsequently, the film 1 with the accessory strips 7 is transferred onto the roll 15 adjacent the second die 13, and the fastener 8 consisting of male and female profiles 4, 5, is extruded from the second die 13 and welded to the film 1 running on the roll 15 by the heat retained from the extrusion formation of the fastener.

The method of the invention offers a number of advantages because the first die for extruding the accessory strips and the second die for extruding the fasteners are disposed in a side-by-side fashion to each other, and therefore can operate at the optimum temperatures for the bonding to the film of the accessory strips and the fastener, respectively.

Since the fastener and the accessory strips are extruded at optimum temperatures, it is now possible to optimize the heat possessed by the fastener and the accessory strips respectively and thus to obtain the precise shapes required of each, when each is bonded to the film. Also, the undesirable damaging of the bonding roll 15 can now be avoided because the pressing of the accessory strips to the film for bonding the former to the latter is conducted in advance to the bonding of the fastener. Consequently, it is possible to correctly and smoothly unite the fastener with the film without the fastener being subjected to any slanting and/or deformation. Thirdly, the invention provides an additional advantage in that, since the accessory strips are bonded to the film before the bonding of the fastener, the film portion adjacent to the accessory strips can be advantageously heated, so that the fastener can be bonded to the film even when the extrusion heat of the fastener is low (which may be desirable to obtain a better fastener shape), i.e. even when the extrusion is made at a temperature which is less than that which would be required for the bonding of the fastener.

Although various minor modifications may be suggested by those versed in the art, it should be understood that I wish to embody within the scope of the patent warranted hereon all such modifications as reasonably and properly come within the scope of my contribution to the art.

I claim as my invention:

1. A method for bonding a plastic fastener, having male and female interlockable profiles, and plastic accessory strip to a plastic film comprising:
   extruding accessory strip from a first forming die,
   extruding fastener from a second forming die,
   disposing said first and second forming dies independently of one another,
   conducting film past said first forming die and then past said second forming die, and
   bonding said accessory strip to a first location on said film adjacent said first forming die and then bonding said fastener onto said film at a further location thereon apart from said first location, after said accessory strip has already been attached, adjacent said second forming die such that the heat retained by said accessory strip from its extrusion does not interfere with the bonding of the fastener at a different bonding temperature.

2. The method of claim 1, further comprising heating said film prior to each bonding step.

3. The method of claim 1, further comprising operating said first forming die with a higher forming temperature than said second forming die.

4. The method of claim 1, further comprising joining said accessory strip means extruded from said first forming die to the surface of said film as said film moves around a bonding roll disposed adjacent said first forming die, feeding said film together with said accessory strip to a pair of nip rolls, and press-bonding said accessory strip onto the surface of said film with said nip rolls.

5. The method of claim 4, further comprising feeding said film with press-bonded accessory strip to a further bonding roll disposed adjacent said second forming die and bonding, on said further bonding roll, said fastener extruded from said second forming die onto the surface of said film with heat.

6. The method of claim 5, further comprising conducting said fastener from said second forming die onto the surface of said film in parallel with said accessory strip at said further bonding roll.

7. The method of claim 5, further comprising providing said further bonding roll with a circumferential groove to receive and guide opposed sides of said fastener profiles as said fastener is bonded to said film.

* * * * *